US009424725B1

(12) United States Patent
Keohane et al.

(10) Patent No.: US 9,424,725 B1
(45) Date of Patent: Aug. 23, 2016

(54) SCHOOL PERIMETER SECURITY SYSTEM

(71) Applicant: INTERNATIONAL BUSINESS MACHINES CORPORATION, Armonk, NY (US)

(72) Inventors: Susann M. Keohane, Austin, TX (US); Shawn P. Mullen, Buda, TX (US); Johnny M. Shieh, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/987,727

(22) Filed: Jan. 4, 2016

(51) Int. Cl.
G08B 13/24 (2006.01)
G06F 17/30 (2006.01)
H04W 4/04 (2009.01)

(52) U.S. Cl.
CPC ...... *G08B 13/2491* (2013.01); *G06F 17/30241* (2013.01); *H04W 4/04* (2013.01)

(58) Field of Classification Search
CPC ............... G08B 13/2491; G06F 17/30241; H04W 4/04; H04W 4/02; H04W 4/021; H04W 64/00; H04W 4/028
See application file for complete search history.

(56) References Cited

U.S. PATENT DOCUMENTS

| 8,768,294 | B2 | 7/2014 | Reitnour et al. | |
|---|---|---|---|---|
| 9,043,882 | B2 | 5/2015 | Keohane et al. | |
| 2013/0162397 | A1* | 6/2013 | Cano | G06Q 10/02 340/7.55 |
| 2013/0183924 | A1* | 7/2013 | Saigh | H04W 4/025 455/404.2 |
| 2013/0290522 | A1* | 10/2013 | Behm, Jr. | H04L 43/10 709/224 |

FOREIGN PATENT DOCUMENTS

JP 2008113184 A 5/2008

* cited by examiner

*Primary Examiner* — James Yang
(74) *Attorney, Agent, or Firm* — Weitzman Law Offices, LLC

(57) ABSTRACT

A school perimeter security system includes a registry database. The registry database includes: registered student mobile device identifiers, registered non-student mobile device identifiers, and a matching of students with authorized non-students with whom the students are permitted to be paired with near the perimeter. At least three beacon devices are located within the school perimeter, positioned to establish a boundary area near the perimeter, detect and establish communication with mobile devices entering the boundary area, obtain an identifier from each mobile device that enters the boundary area, and facilitate trilateration of all mobile devices within the boundary area. The processor and beacon devices cooperatively interact to identify every mobile device entering the boundary area, track the location of every mobile device within the boundary area, compare the identified mobile devices with identifiers in the registry database and, transmit an alert notice when a condition is satisfied.

1 Claim, 2 Drawing Sheets

SCHOOL PERIMETER SECURITY SYSTEM

FIELD OF THE INVENTION

This disclosure relates generally to computing technology and, more particularly, to computer-based security systems.

BACKGROUND

Security systems are important around school buildings, particularly where younger students are present. At drop-off and pick-up times, the mix of a large number of students outside the building and a large number of persons/vehicles can be chaotic, and significant vigilance can be required to avoid the situation where a student leaves with a person who is not authorized to take that student or a student goes off premises alone when they are supposed to be picked up by someone. Such situations create a security risk.

Likewise, current practice often relies upon school personnel recognizing the persons and/or vehicles arriving or leaving the premises, making the identification of persons or vehicles that should not be present on the grounds subject to human error, with potentially significant adverse consequences.

SUMMARY

One aspect of this disclosure involves a school perimeter security system including at least one processor, non-transitory storage, accessible to the at least one processor, and a registry database, stored within the non-transitory storage. The registry database includes a maintained listing including: i) registered student mobile device identifiers, corresponding to students of the school who are allowed to be within the school perimeter, ii) registered non-student mobile device identifiers, corresponding to authorized non-students who are allowed to be within the school perimeter, and iii) a matching of students with authorized non-students with whom the students are permitted to be paired with near the school perimeter.

The school perimeter security system also includes at least three beacon devices located within the school perimeter. The at least three beacon devices are communicatively coupled to the at least one processor and positioned so as to: establish a boundary area near the school perimeter, detect and establish communication with mobile devices entering the boundary area, obtain an identifier from each mobile device that enters the boundary area, and facilitate trilateration of a location of all mobile devices within the boundary area.

The at least one processor and at least three beacon devices cooperatively interact, under program control, such that the processor will i) identify every mobile device entering the boundary area by identifier and location, ii) track the location of every mobile device within the boundary area, iii) compare the identified mobile devices with the registered student mobile device identifiers and registered non-student mobile device identifiers in the registry database and, transmit an alert notice to at least one designated recipient when at least one of the following conditions are satisfied: a) a mobile device has entered the boundary area that is not present within the maintained listing, b) a registered student is near the perimeter and substantially co-located with either a registered non-student with whom the registered student is not authorized to be paired with, or a mobile device that is not present within the maintained listing, or c) a registered student passes through the boundary area to beyond the perimeter at a time when the registered student is not authorized to do so.

Advantageously, our system increases security by reducing the prospect for human error when students are picked up from school.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This disclosure provides a technical solution to address the aforementioned problems that improves upon present school security systems. Our solution takes advantage of the fact that, nowadays, most people have or are closely associateable with some form of mobile device with communication capability, e.g., smart phone, smart watch, tablet computer, automobile with wifi or Bluetooth transceivers, with them when they are out and about. To the extent that they don't have such devices, such transceivers or wireless RTLS tags are fairly inexpensive to obtain and issue as "mobile devices" to students or others, to keep on or near their person (or for younger students can be secreted in an article of clothing, backpack, etc.), when near or on school grounds. Thus, the mobile devices can serve as surrogates for the persons with whom they are associated and allow for better, if still imperfect, identification of what student is leaving with whom and when a person who could pose a danger enters the school grounds, thereby reducing the prospect for human error of school personnel in releasing a student to someone to whom they should not be released, and improving the ability for those school personnel to promptly identify and react to the presence of persons or movement of students that merit increased vigilance.

Figure 1:
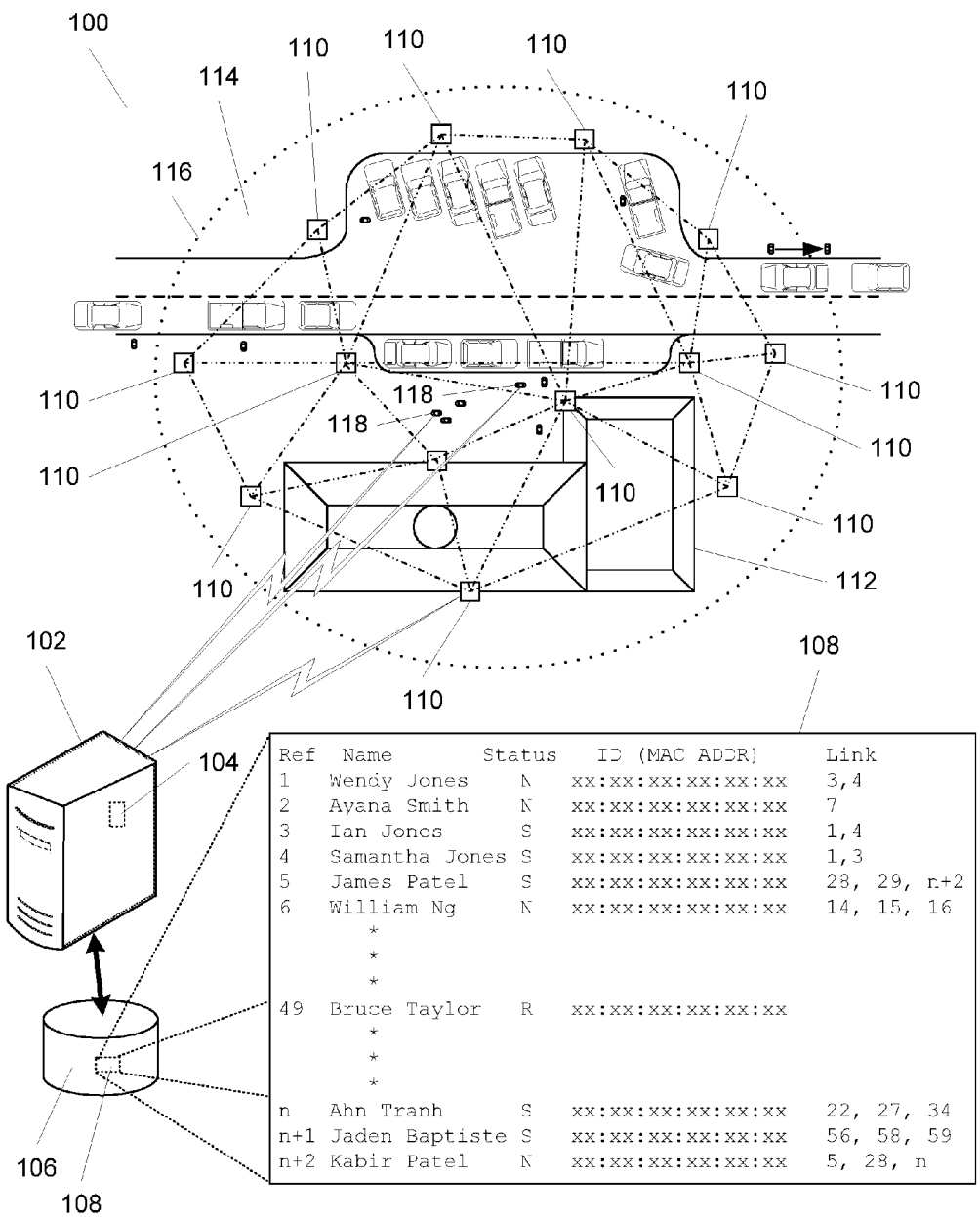
FIG. 1 illustrates, in simplified overview, an example partial overhead view of school perimeter security system as described herein.

FIG. 1 illustrates, in simplified overview, an example partial overhead view of school perimeter security system 100 as described herein. The system 100 is made up of at least one computer 102 having at least one processor 104 therein, and storage 106 that the processor can access and read from/write to. In this regard, it is to be understood that, unless otherwise specifically noted, all references to "storage" herein refers to storage that stores (or can store) format defining data structures, data-containing structures, and/or program instructions in a non-transitory manner, for example, such as non-transient solid state memory, a magnetic hard drive, a CD or DVD, a tape drive, or an analogous or equivalent storage medium type would.

Stored within the storage 106 is a registry database 108 that will typically be implemented as a relational database, that, depending upon the particular implementation may be local or distributed. The registry database 108 contains a listing of the mobile device identifiers that correspond to students (S) of the school (i.e., those who are allowed to be within a specified perimeter about the school). The registry database 108 also contains a listing of mobile device identifiers that correspond to non-students (N), e.g., parents, guardians, caretakers, teachers, other school staff, etc., who are also allowed to be within a specified perimeter about the school. Optionally, some implementations of the registry database 108 may further contain a listing of the mobile device identifiers for persons who are "restricted" (R), i.e., not to be allowed within a specified perimeter about the school, for example, due to a judicial order (e.g., divorce decree, order of protection, restraining order, presence on an offender registry, etc.).

The listings in the registry database 108 are interrelated so as to match students listed in the registry database 108 with non-students listed in the registry database 108 with whom they are allowed to be paired with (i.e., located with or released to) when within the school perimeter.

Optionally, the listings in the registry database 108 may also be interrelated such that they expressly specify non-students who specifically may not be paired with certain students listed in the registry database 108.

The system also includes multiple communication beacon devices 110, at least three, but likely more, positioned around the grounds of the school building 112 so as to establish a boundary area 114 about the school building 112 within the perimeter 116. The communication beacon devices 110 are designed to detect mobile devices 300, for example, cell phones, tablet computers, laptop computers, smart watches, Internet of Things ("IoT") devices, Wireless RTLS tags, etc., that enter the boundary area 114, attempt to establish communication with those mobile devices and obtain their assigned unique identifier (i.e, their "mobile device identifier") from them, typically a media access control ("MAC") address (also sometimes referred to as a hardware address or physical address) under the IEEE family of Standards (e.g., 802.11, 802.15, 802.16, 802.20, 802.21, 802.22, 802.24, 802.25).

In addition, the communication beacon devices 110 are connected to the at least one processor 104 and positioned so that, in conjunction with the at least one processor 104, the location of each detected mobile device within the boundary area 114 can be tracked using trilateration techniques, multilateration techniques or other techniques that are suitable for locally locating and tracking such mobile devices using communication networks other than cellular telecommunication networks. For simplicity, those techniques are all interchangeably referred to herein as "trilateration."

Once the at least one processor 104 has received the unique identifier of a mobile device, under program control, it will continue to track the location of that mobile device as it moves within the boundary area 114. In addition, the at least one processor 104 will access the registry database 108 and compare the mobile device's unique identifier with the mobile device identifiers for the students and non-students listed in the registry database 108 in order to determine if some specified conditions exist that warrant an alert notification.

Figure 2:
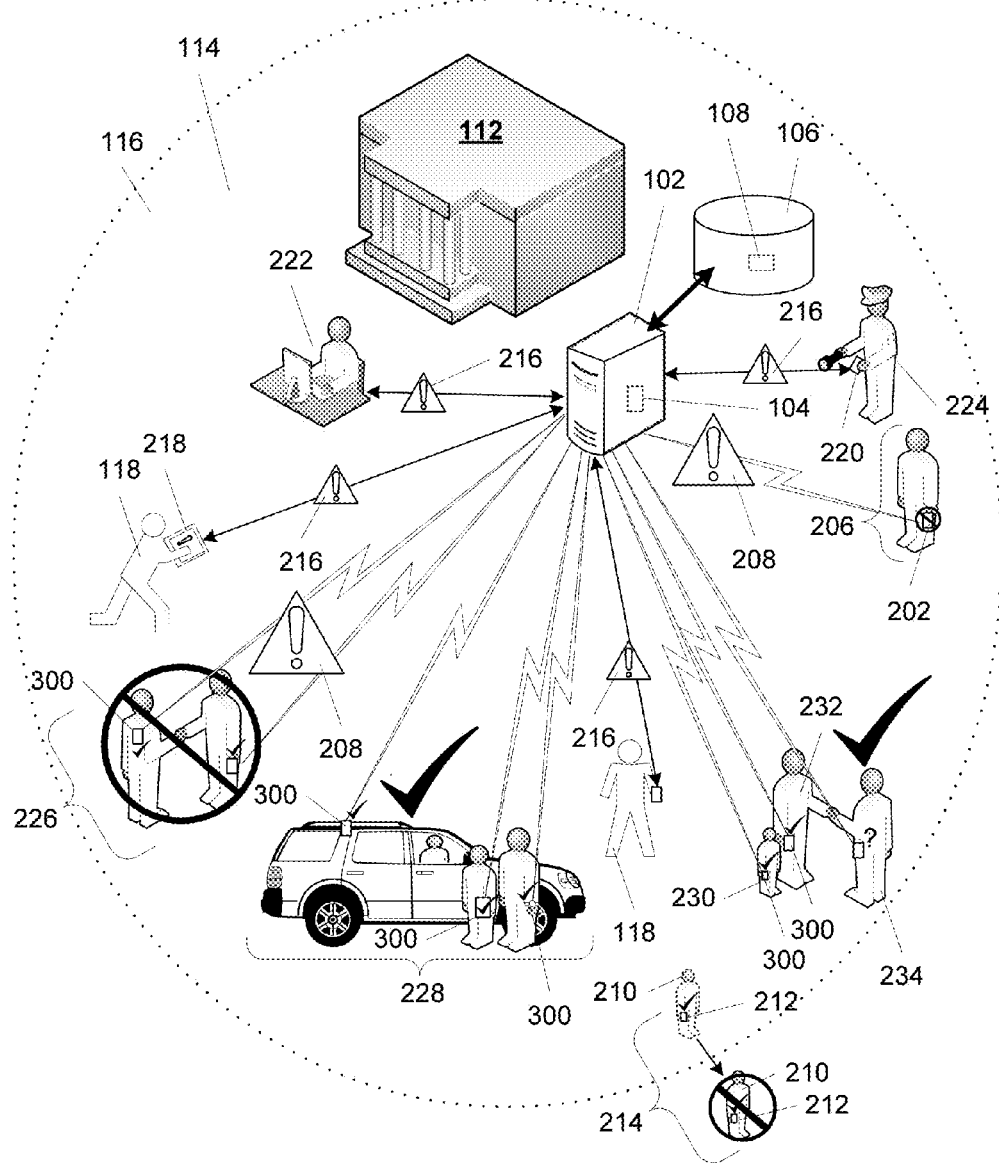
FIG. 2 illustrates, in simplified form, various conditions that could be identified as a result of the location tracking and comparisons of the various mobile device identifiers.

Referring now to FIG. 2 and with continuing reference to FIG. 1, FIG. 2 illustrates, in simplified form, various conditions that could be identified as a result of the location tracking and comparisons of the various mobile device identifiers.

As a result, the at least one processor 104 can identify when a mobile device 202 (and consequently the associated person 204) has entered the boundary area 114 but is not listed in the registry database 108 as being a condition 206 where a problem 208, or when a student 210 whose mobile device 212 is listed in the registry database 108 passes through the boundary area 114 to beyond the perimeter 116 at a time when they should not be doing so as a further problem condition 214. In either case, when such a condition is detected, the at least one processor can send an alert notice 216 (which can be one or more of an audible alert, a visual alert, or a tactile alert) to a device 218, 220, for example, a smart phone, smart watch, tablet, etc., associated with one or more designated recipients 118, typically some authority personnel near the location of concern. Advantageously, depending upon the particular implementation, the alert notice can be provide to only the designated recipient 118 closest to the location of concern to avoid distracting other personnel, it can be provided to all of the designated persons within the boundary area 114, or it can be provided to certain people as part of a hierarchical alert notice approach such that, for example, the designated recipient closest to the location is given the alert and, if they do not respond via their mobile device that the situation has been checked and is OK within a small window of time, or if they respond via their device that there is a problem, other alert notices can be sent, which may include, for example, notifying certain other administrative personnel 222 or non-school personnel 224 such as police on the school grounds or nearby.

Moreover, since the location tracking is performed for all of the detected mobile devices within the boundary area 114, the at least one processor 104 can then determine if a registered student is near the perimeter 116 and substantially co-located with (i.e., nearby within a margin of location detection error) a registered non-student with whom the student is not authorized to be paired with as an alert notice condition 226. This may include, for example, a non-custodial parent, who may be authorized to be on the grounds but may have split custody of a sibling student and not have custody of that student, or who may have shared custody and the particular day is not a custody day. Likewise, it may prevent a situation where a parent, babysitter or caretaker of another student, might take another student for a play date without the knowledge or authorization of the other student's guardian.

Thus, it should be appreciated that the registry database 108 can easily be updated by school personnel such that, if, for example, a student's parent calls and gives permission for their student to go home with another student, the matching in the registry database 108 can be updated to reflect that fact for that day, so that no alert condition 228 occurs that day and reverted back thereafter.

Finally, it should be appreciated that more sophisticated analysis can be performed such that, if a registered student 230 is matched with some specific authorized non-student 232, then the system can be programmed such that no alert notification will be sent if that co-located pair 230, 232 are later co-located with a person 234 who is either unregistered or could not otherwise be paired with the student 230 (i.e., an unauthorized person). However, since the system 100 will continue to track them all, if later, the student 230 and the unauthorized person 234 are co-located (based upon their mobile devices 230) and the authorized non-student 232 leaves, an alert notice can then be sent.

One last note, it should be understood that a further advantage to our system 100 is that the computer 102 and database 106 can be operated and maintained locally by the school 112, but the school district, or by a third party in a cloud computing environment who provides that aspect as a service.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A school perimeter security system comprising:
   I) at least one processor;
   II) non-transitory storage, accessible to the at least one processor;
   III) a registry database, stored within the non-transitory storage, the registry database comprising a maintained listing including:
      i) registered student mobile device identifiers, corresponding to students of the school who are allowed to be within a perimeter of the school,
      ii) registered non-student mobile device identifiers, corresponding to authorized non-students who are allowed to be within the school's perimeter,
      iii) a matching of students corresponding to the registered student mobile device identifiers with the registered non-student mobile device identifiers corresponding to the authorized non-students with whom the students are permitted to be paired with near the school's perimeter;
   IV) at least three beacon devices located within the school's perimeter, the at least three beacon devices being
      i) positioned so as to
         a) establish a boundary area near the school's perimeter,
         b) detect and establish communication with mobile devices entering the boundary area,
         c) obtain an identifier from each mobile device that enters the boundary area,
         d) facilitate trilateration of a location of all mobile devices within the boundary area, and
         e) determine a relative distance between the mobile devices and the school's perimeter such that it can be determined whether any individual mobile device is near the school's perimeter; and
      ii) communicatively coupled to the at least one processor; and
   V) wherein the at least one processor and at least three beacon devices cooperatively interact, under program control, such that the processor will
      i) identify every mobile device entering the boundary area by identifier and location,
      ii) track the location of every mobile device within the boundary area,
      iii) compare the identifiers of the identified mobile devices with the registered student mobile device identifiers and registered non-student mobile device identifiers in the registry database and, transmit an alert notice to at least one designated recipient when at least one of the following conditions are satisfied:
         a) a mobile device has entered the boundary area but its identifier is not present within the maintained listing,
         b) a registered student corresponding to a registered student mobile device identifier maintained in the registry database listing is near the school's perimeter and co-located, within a margin of detection error, with either a mobile device corresponding to a registered non-student with whom the registered student is not authorized to be paired with, or a mobile device that is not present within the maintained listing, or
         c) a registered student corresponding to a registered student mobile device identifier maintained in the registry database listing passes through the boundary area to beyond the school's perimeter at a time when the registered student is not authorized to pass through the boundary area to beyond the school's perimeter.

* * * * *